June 6, 1933.  H. SONDERMANN  1,913,008
HYDRAULIC MACHINE FOR TESTING PIPES AND THE LIKE
Filed Nov. 4, 1932
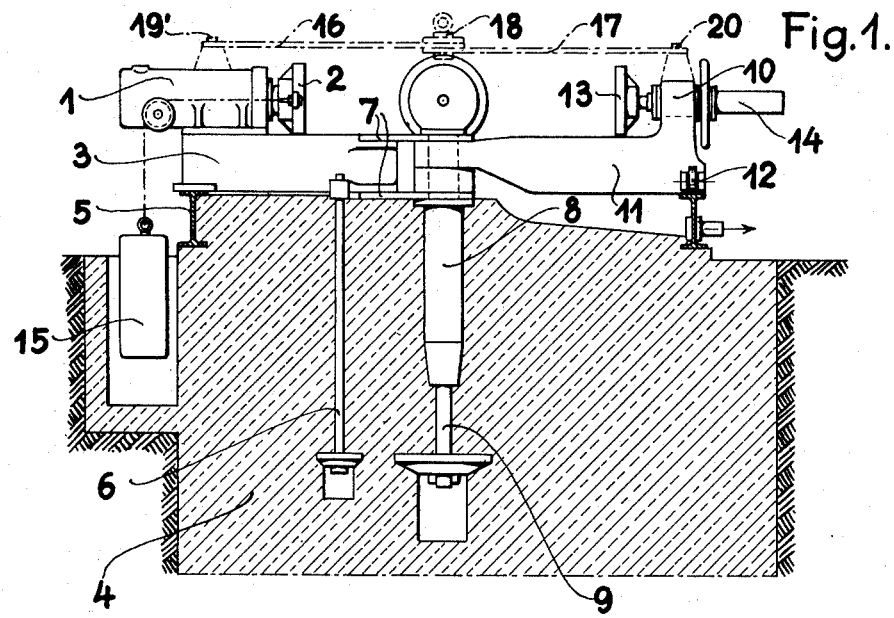
Fig.1.
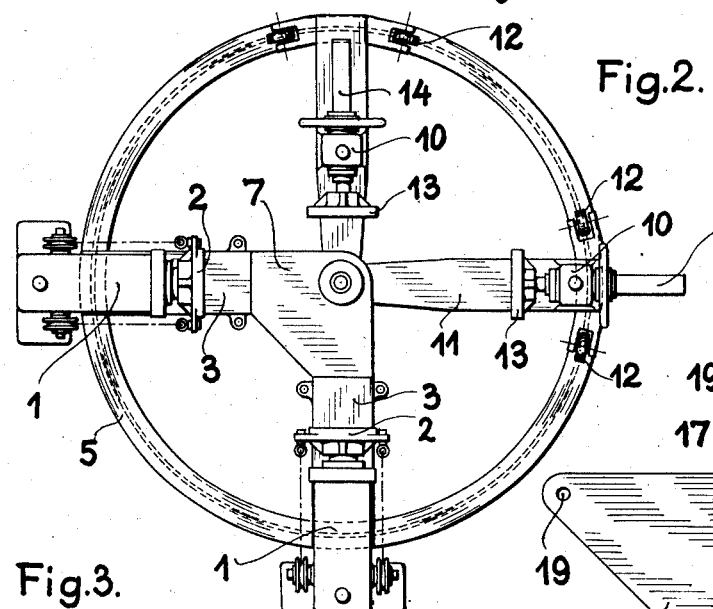
Fig.2.
Fig.4.
Fig.3.
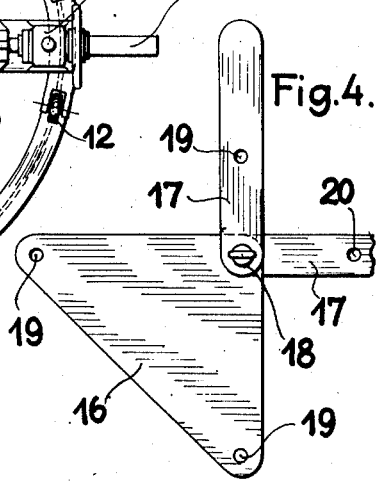
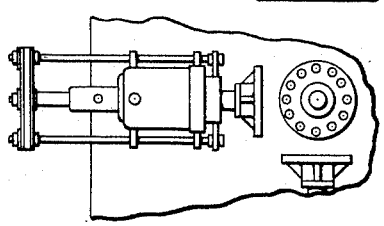
INVENTOR.
Hermann Sondermann
BY
ATTORNEYS.

Patented June 6, 1933

1,913,008

UNITED STATES PATENT OFFICE

HERMANN SONDERMANN, OF DUSSELDORF, GERMANY

HYDRAULIC MACHINE FOR TESTING PIPES AND THE LIKE

Application filed November 4, 1932, Serial No. 641,147, and in Germany July 18, 1931.

The invention relates to a hydraulic testing machine by means of which the fluid-tightness of pipes, pipe connections or other hollow bodies is investigated. The apparatus hitherto used for this purpose have the disadvantage that the very great forces produced in the testing are transmitted in a most undesirable manner on to a ring-shaped foundation frame which in consequence must be made extremely heavy. Other testing machines have been suggested in which the forces produced in the testing are taken up by tension rods which connect the press cylinders and the tension blocks. With the use of such devices, however, the branch pieces connected on to the straight main pipe must be separately sealed, which procedure takes a considerable time and involves more work. Further testing machines are known in which a press cylinder and a tension block are hinged by means of tension bars to a common horizontal trunnion fixed in a bearing block and which oscillate in a common perpendicular central plane. This known testing machine permits of straight pipes and simple curves being tested, but for connections of other shapes it is not suitable.

According to the present invention, the improved testing machine is so arranged that a number of hydraulic press cylinders and a number of tension blocks are hinged at the top of a common vertical main or king pin, this king pin being anchored in the axial direction in the foundation upon which the press cylinders and tension blocks rest. The press cylinders are preferably anchored, for example, at right angles to each other, in the foundation, while the tension blocks can rotate on a circular rail having the same axis as the king pin.

In order to relieve the strain on the foundation if pipe connections of large dimensions are to be tested, vertical pins are preferably arranged on the press cylinder and tension blocks, these being connected by tension members to a common pin having the same axis as the main or king pin.

With such a testing machine, pipes and pipe connections of all kinds can be conveniently and rapidly tested for fluid-tightness and the cost of this machine is considerably less than that of the hitherto usual testing machine.

A construction of the improved testing machine is shown by way of example in the accompanying drawing.

Fig. 1 is a partial vertical axial section of the testing machine, and

Fig. 2 is a plan view thereof.

Fig. 3 is a plan view of a hydraulic press cylinder with hydraulic return movement.

Fig. 4 is a plan view of a tensioning device for the press cylinder and setting blocks for exceptionally large connection parts.

Two hydraulic press cylinders 1 constructed in the usual manner, the press heads 2 of which rest against the openings of the pipe connections to be tested, are fixed on two bearing blocks 3 which are carried over their whole length on a foundation block 4 and rest at the rear on an annular I-section girder 5. The said bearing blocks are connected to the foundation by anchors 6 and are hinged by link plates 7 to a king pin 8, disposed vertically at the centre point of the ring 5 and which is attached to the foundation by means of an anchor 9. In Fig. 1, the axes of the two press cylinders 1 are disposed at right angles to each other but may be differently arranged if the connection to be tested makes this necessary, or a third hydraulic cylinder may be provided, fixed in the same manner as the two cylinders 1, or in the same way as two tension blocks 10. These latter are fitter on extension arms 11 which are so hinged between the link plates 7 on the king pin 8 that they rotate easily and can be rotated externally as desired by means of supporting rollers 12 on the annular I-section girder 5. The pressing-on heads 13 are adjustable in the usual manner by means of screw spindles 14.

The return stroke of the hydraulic piston is effected by counter weights 15, but can be effected as shown in Fig. 3 by means of water pressure.

When the connections under test are of large dimensions, the blocks 3 and extension arms 11 are preferably constructed of wrought iron, use being made of I-section girders. It is also preferable in this case to reduce the tilting moments which are to be taken up by the foundation and the anchors by the provision of a mutual anchoring located above the connection piece extending between the press cylinders and tension blocks, as shown in dotted lines in Fig. 1 and in plan in Fig. 4. This anchoring consists of a triangular plate 16 or other member with holes 19, flat connecting rods 17 with holes 20 and a common pin 18 having the same axis as the king pin 8.

By means of the holes 19 or 20, this anchoring device is fitted on pins 19' or 20' of the press cylinders or of the tension blocks after the part to be tested has been brought into approximately the correct position.

In order safely to take up the tensile stresses produced in the upper part of the foundation, this is reinforced where necessary with iron.

I claim:

1. A hydraulic machine for testing pipes or the like comprising a support, a king pin disposed centrally of said support, testing cylinders and tension blocks carried on said support to extend radially from said pin and hinge connections between the king pin and both said cylinders and said tension blocks, whereby the stresses arising during testing operations are mainly taken up by the said king pin.

2. In a machine as claimed in claim 1, the support being in the form of a circular foundation and the king pin being anchored vertically centrally of said foundation.

3. In a machine as claimed in claim 1, the support being in the form of an annular girder carried by and co-axially with a circular foundation and the king pin being anchored axially of said foundation.

4. A hydraulic machine for testing pipes or the like, comprising a horizontal foundation, an annular girder carried on the said foundation, a vertical king pin secured by its lower end in said foundation at the geometric centre of said girder, testing cylinders, supports for said cylinders arranged radially to the girder, means hingedly connecting the inner ends of said supports to the upper end of said king pin, means for anchoring said supports to the foundation, tension blocks, supports for said tension blocks arranged radially to the girder, means hingedly connecting the inner ends of said second-mentioned supports to the upper end of the king pin, and means for supporting the outer ends of said second-mentioned supports for free movement on the girder.

5. In a machine as claimed in claim 4, the second-mentioned supports being formed as arms provided at their outer ends with rollers running on the girder.

In testimony whereof I affix my signature.
HERMANN SONDERMANN.